US007980025B1

(12) United States Patent
Cleveland

(10) Patent No.: US 7,980,025 B1
(45) Date of Patent: Jul. 19, 2011

(54) DECORATIVE DISPLAY

(76) Inventor: Grant Cleveland, Chagrin Falls, OH (US)

( * ) Notice: Subject to any disclaimer, the term of this patent is extended or adjusted under 35 U.S.C. 154(b) by 0 days.

(21) Appl. No.: 12/283,020

(22) Filed: Sep. 9, 2008

(51) Int. Cl.
*A01G 5/00* (2006.01)

(52) U.S. Cl. .......................................... 47/41.01

(58) Field of Classification Search .................. 47/41.12
See application file for complete search history.

(56) References Cited

U.S. PATENT DOCUMENTS 3,816,224 A * 6/1974 Smart et al. .................. 47/41.12
4,023,289 A * 5/1977 Crawford ........................ 40/406
2002/0015808 A1* 2/2002 Lindauer et al. ................ 428/13
2003/0049578 A1* 3/2003 Freeman et al. .............. 431/291
2003/0084608 A1* 5/2003 Garcia et al. ................ 47/41.12
2003/0131528 A1* 7/2003 Vonk et al. ................... 47/41.01

FOREIGN PATENT DOCUMENTS

CA 2581584 A1 * 9/2008
JP 09023751 A * 1/1997

* cited by examiner

*Primary Examiner* — Francis T Palo

(74) *Attorney, Agent, or Firm* — Bryan Cave LLP

(57) ABSTRACT

A display and a method for making the same, comprising a transparent container, a mixture of fluid and superabsorbent polymer, and ornamental items suspended in the mixture such that they are visible from outside the transparent container.

14 Claims, 7 Drawing Sheets

DECORATIVE DISPLAY

FIELD OF THE INVENTION

The present invention generally relates to displays, such as decorative displays. More particularly, the present invention relates to a decorative display in a transparent container, comprising a mixture of fluid and superabsorbent polymer, with ornamental items suspended in the mixture.

BACKGROUND OF THE INVENTION

Decorative displays are aesthetically pleasing and frequently utilized as attractive celebratory items to commemorate special events, such as holidays, birthdays, graduations, and weddings. Decorative displays are frequently comprised of flower arrangements, balloon arrangements, candle arrangements, and the like, and can be adorned with ribbons, glitter, or similar ornamental items.

These decorative displays are typically contained in a vessel, such as a vase which contains a flower arrangement. However, vases and other vessels are typically transparent and serve no aesthetic purpose other than to hold the display arrangement together. For example, a clear vase holding a flower arrangement provides an observer with unsightly views of cut plant stems.

Thus, there is a need for displays which utilize transparent containers and turn them into decorative items in and of themselves, to provide the viewer with a more pleasing overall aesthetic impression.

SUMMARY OF THE INVENTION

Among the various aspects of the present invention is a display, comprising a transparent container, a mixture of a fluid and a superabsorbent polymer in the transparent container, and ornamental items suspended in the mixture at varying depths and distances from the sides of the container, such that the ornamental items are visible from outside the transparent container.

Another aspect of the invention is a method for preparing a display, comprising mixing a fluid with a superabsorbent polymer, containing the mixture in a transparent container, and suspending ornamental items in the mixture such that the ornamental items are visible from outside the transparent container.

In a further aspect of the invention, the ornamental items can be foam letters, foam shapes, glitter, glitter shapes, confetti, leaves, sequins, tinsel, plastic patterns, flowers, or any combination thereof.

In a further aspect of the invention, the superabsorbent polymer is a polyacrylate salt.

In a further aspect of the invention, the display further comprises a decorative item that extends into, and out of and above, the mixture. This decorative item can be cut flowers, cut plants, greenery, dried flowers, synthetic flowers, mounted balloons, mounted candy, candles, signs, sticks, or any combination thereof.

Other objects and features will be in part apparent and in part pointed out hereinafter.

DETAILED DESCRIPTION OF THE DRAWINGS

Figure 1:
FIG. 1 shows ornamental items in the form of shapes and letters.

FIG. 1 shows ornamental items in the form of shapes and letters. The ornamental items in the shapes of party hats, balloons, and the words "happy" and "birthday" reflect a celebratory event, in this case a birthday. The ornamental items can be made from any material suitable for inclusion in the decorative display, such as, without limitation, foam, glitter, plastic, metallic material, or any combination thereof.

Figure 2:
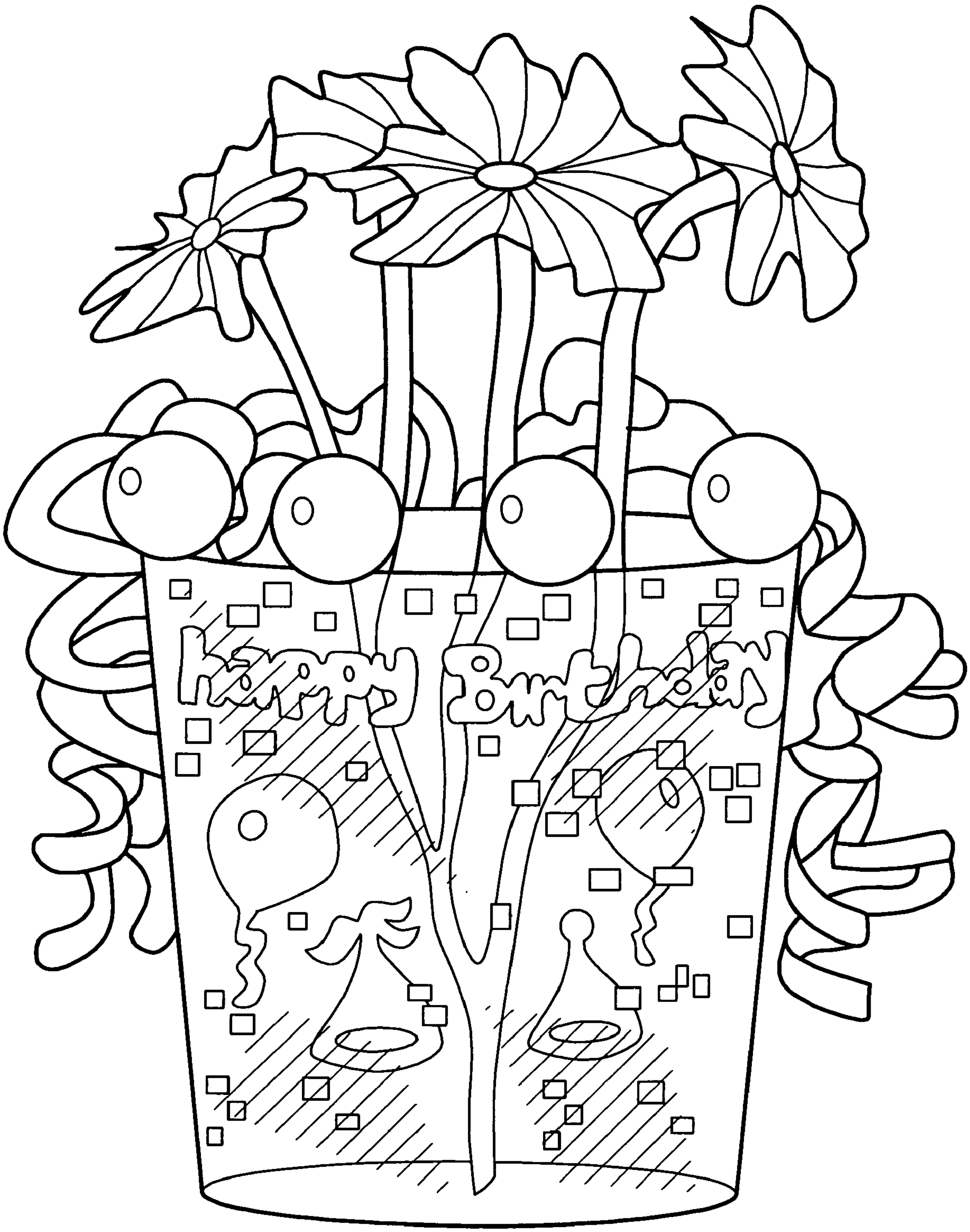
FIG. 2 shows a decorative display with ornamental items suspended in the fluid and superabsorbent polymer mixture inside a transparent container, with decorative items in the form of cut flowers extending into said mixture and extending out of and above said mixture.

FIG. 2 shows a decorative display with a birthday theme, with ornamental items suspended in the fluid and superabsorbent polymer mixture inside a transparent container. The ornamental items are positioned at varying depths and distances from the sides of the transparent container such that they are readily visible to a viewer looking at the front of the display. FIG. 2 also shows decorative items in the form of cut flowers, ribbons, and small balloons extending into the fluid and superabsorbent polymer mixture and extending out of and above said mixture and the transparent container.

Figure 3:
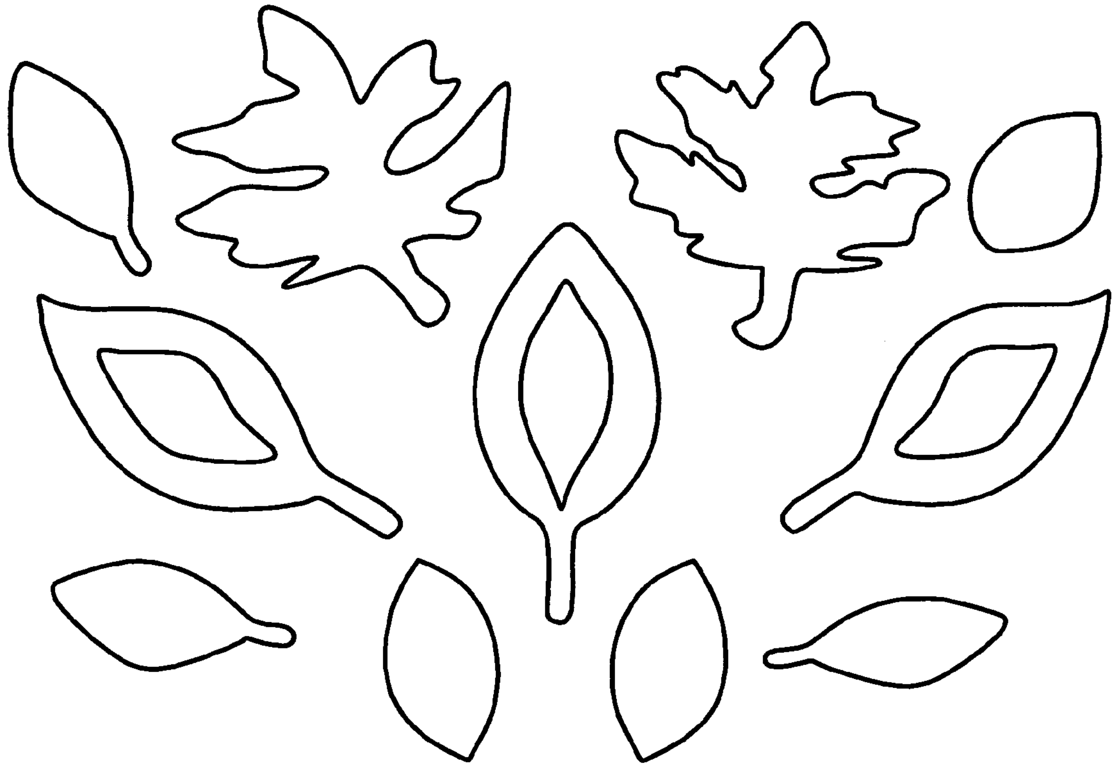
FIG. 3 shows ornamental items in the form of foam shapes and leaves.

FIG. 3 shows ornamental items in the form of shapes. The ornamental items in the shapes of leaves are selected to represent a theme, in this case, the autumnal season. The ornamental items can be made from any material suitable for inclusion in the decorative display, such as, without limitation, foam, glitter, plastic, metallic material, or any combination thereof.

Figure 4:
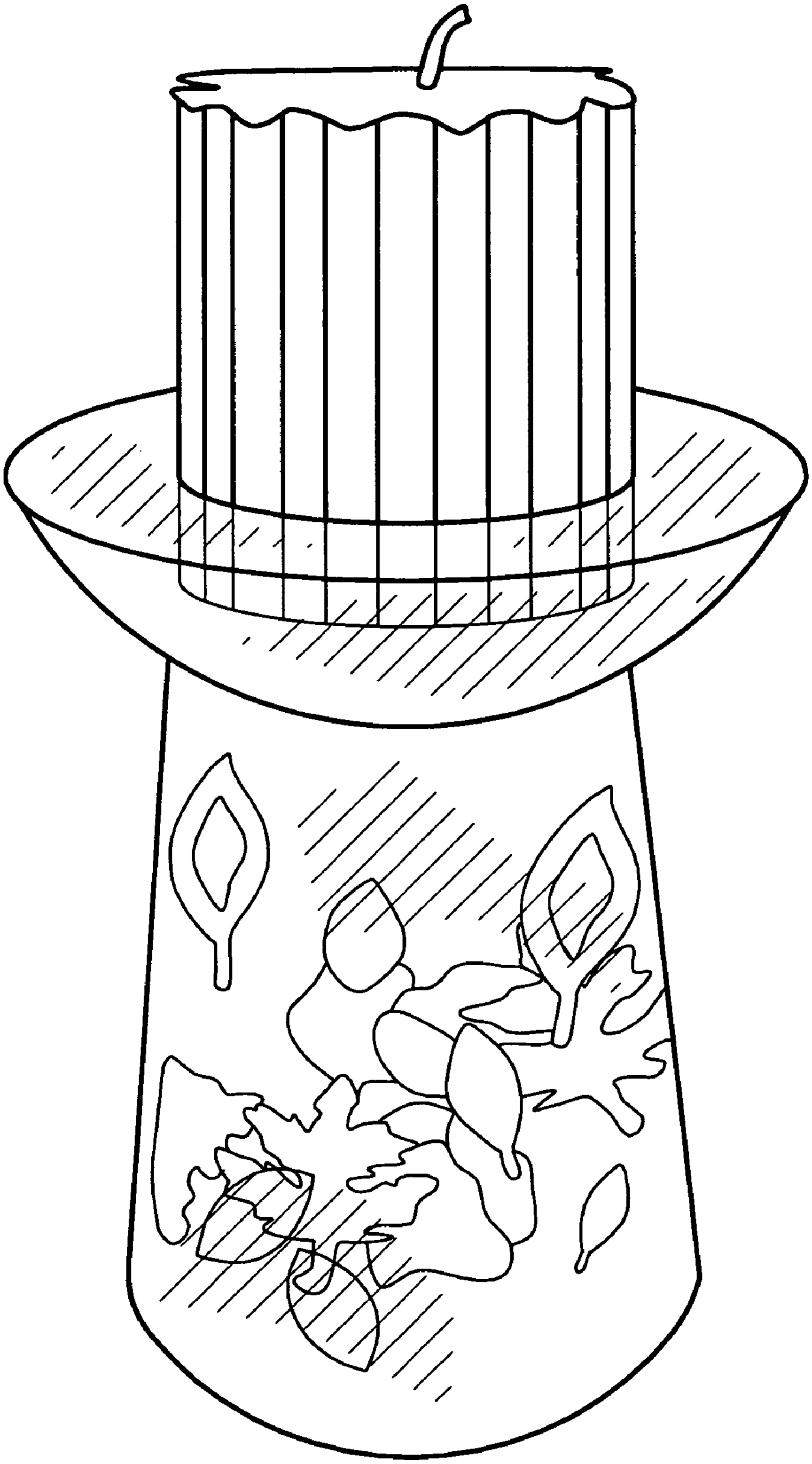
FIG. 4 shows a decorative display with ornamental items, in the form of foam shapes and leaves, suspended in the fluid and superabsorbent polymer mixture inside a transparent container, with a decorative item in the form of a candle extending into said mixture and extending out of and above said mixture.

FIG. 4 shows a decorative display with an autumnal theme, with ornamental items suspended in the fluid and superabsorbent polymer mixture inside a transparent container. The ornamental items are positioned at varying depths and distances from the sides of the transparent container such that they are readily visible to a viewer at any orientation. FIG. 4 also shows a decorative item in the form of a candle, extending into the fluid and superabsorbent polymer mixture, and extending out of and above said mixture and the transparent container.

Figure 5:
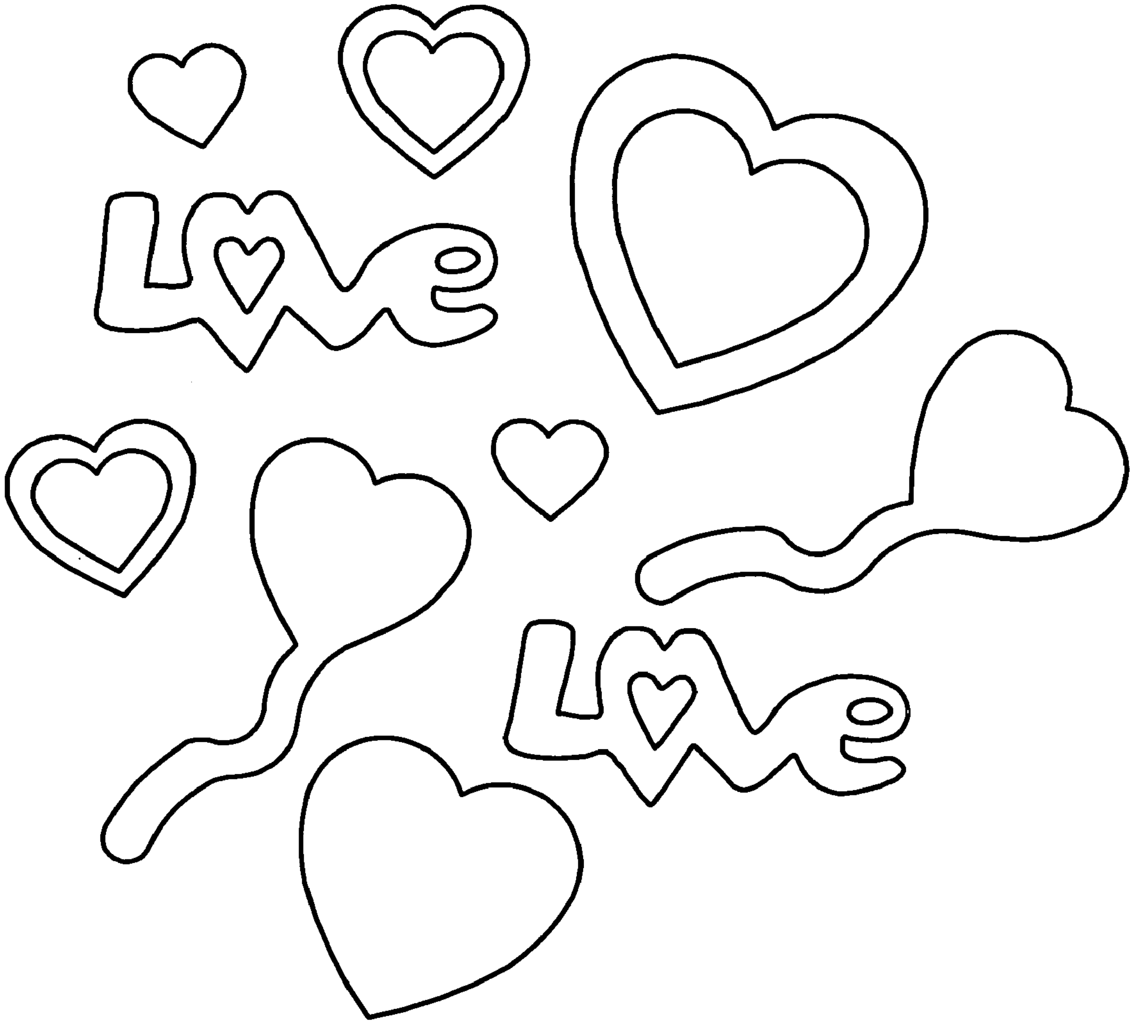
FIG. 5 shows ornamental items in the form of foam shapes and foam letters.

FIG. 5 shows ornamental items in the form of shapes and words. The ornamental items in the shape of hearts and the words "love" are selected to represent a holiday such as Valentine's Day, or an event such as an anniversary. The ornamental items can be made from any material suitable for inclusion in the decorative display, such as, without limitation, foam, glitter, plastic, metallic material, or any combination thereof.

Figure 6:
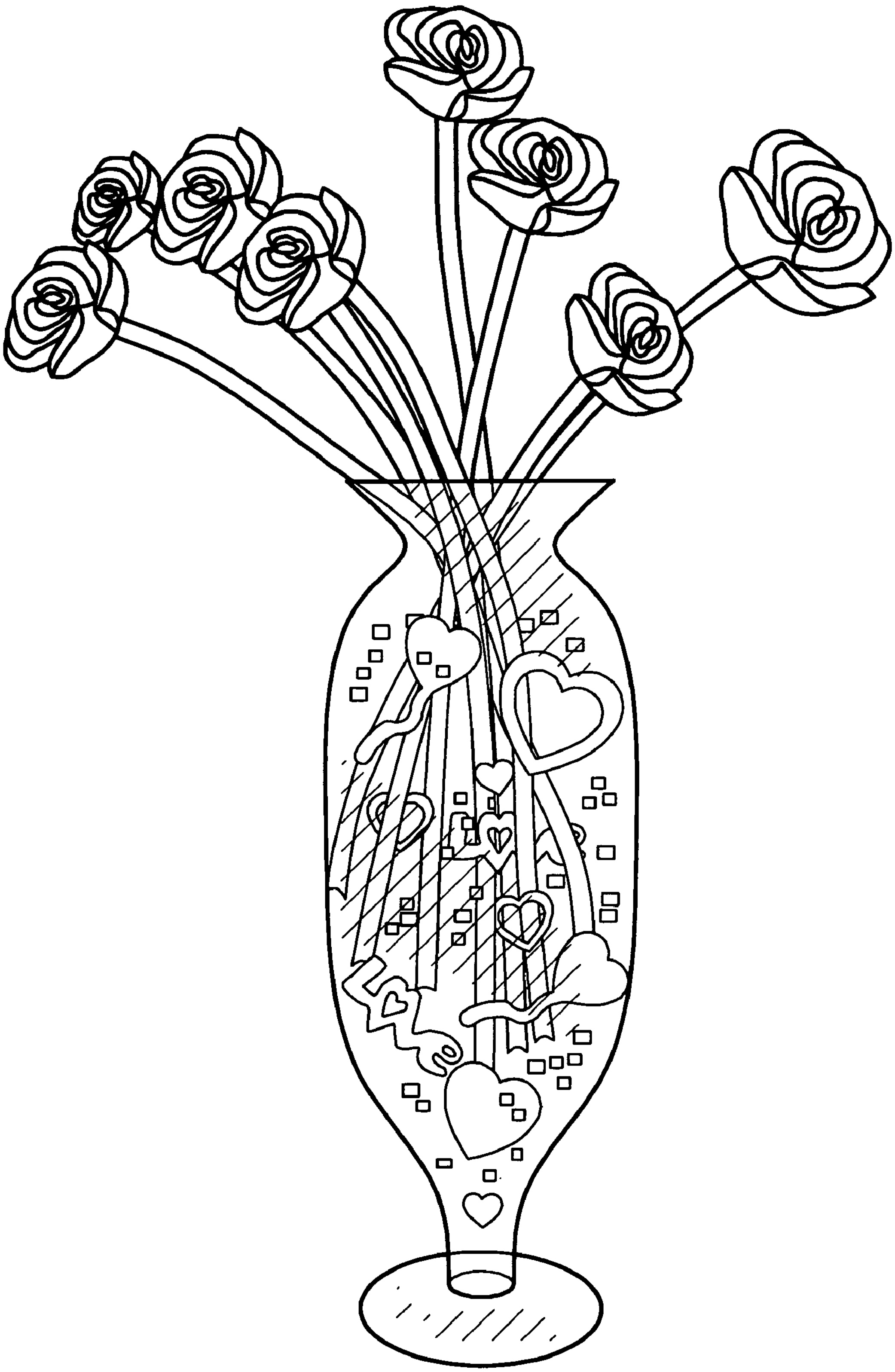
FIG. 6 shows a decorative display with ornamental items, in the form of foam shapes and foam letters, suspended in the fluid and superabsorbent polymer mixture inside a transparent container, with decorative items in the form of cut flowers and greenery extending into said mixture and extending out of and above said mixture.

FIG. 6 shows a decorative display with a Valentine's Day or anniversary theme, with ornamental items suspended in the fluid and superabsorbent polymer mixture inside a transparent container. The ornamental items are positions at varying depths and distances from the sides of the transparent container such that they are readily visible to a viewer at any orientation. FIG. 6 also shows decorative items in the form of cut flowers, dried flowers, or synthetic flowers, extending into the fluid and superabsorbent polymer mixture, and extending out of and above said mixture and the transparent container.

Figure 7:
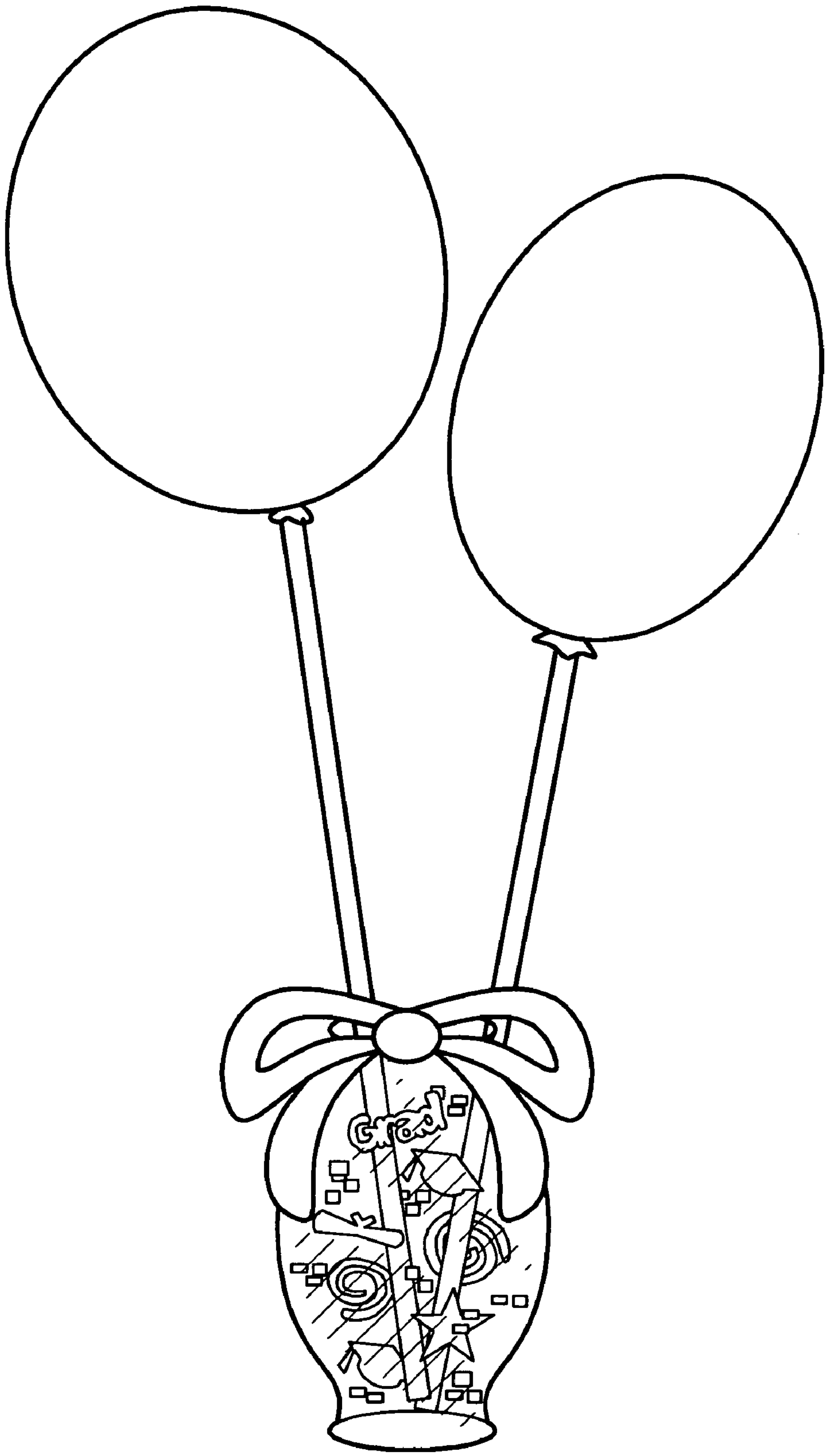
FIG. 7 shows a decorative display with ornamental items suspended in the fluid and superabsorbent polymer mixture inside a transparent container, with decorative items in the form of balloons and sticks extending into said mixture and extending out of and above said mixture.

FIG. 7 shows a decorative display with a graduation theme, with ornamental items suspended in the fluid and superabsorbent polymer mixture inside a transparent container. The ornamental items are selected to reflect an event; in this case, the word "grad" and shapes of a diploma and graduation hats were selected. The ornamental items can be made from any material suitable for inclusion in the decorative display, such as, without limitation, foam, glitter, plastic, metallic material, or any combination thereof. FIG. 7 also shows decorative items in the form of balloons, extending into the fluid and superabsorbent polymer mixture, and extending out of and above said mixture and the transparent container.

DETAILED DESCRIPTION OF THE INVENTION

One aspect of the present invention is directed to a transparent container. The transparent container may be a single compartment with a bottom and at least one upwardly-extending wall. The bottom and upwardly extending wall define a receptacle into which decorative items or a liquid may be placed. For example, the transparent container may be, without limitation, a vase, a bowl, a hollow pedestal, or even a beverage glass or cup. The upwardly-extending walls of the transparent container need not be vertical. For example, the transparent container can be taper-shaped, cylindrical-shaped, bowl-shaped, cone-shaped, pyramid-shaped, frustum-shaped, and so forth. The shape and/or size of the transparent container will be dictated by the type of decorative display desired. For example, a tall, narrow vase may be chosen to display a small arrangement of flowers, while a bowl might be more suitable for an arrangement utilizing several candles.

In a preferred embodiment, the transparent container may be a single compartment. In an alternate embodiment, the transparent container has a multi-compartment configuration. One skilled in the art will appreciate that, in this alternative multi-compartment configuration, each compartment may have any of the cross-sections and shapes as noted above for the single compartment container configuration.

The material used for the transparent container is preferably glass; however, other transparent mediums could be used.

In another aspect of the present invention, a mixture of a fluid and a superabsorbent polymer is contained in the transparent container.

In a preferred embodiment, the fluid is water. The mixture can form a viscous medium, which allows water for any plants or flowers, while also allowing ornamental items to be suspended in the medium at varying depths and distances from the sides of the transparent container.

In one embodiment, the superabsorbent polymer is any polymer which is capable of absorbing water. In a preferred embodiment, the superabsorbent polymer is a polyacrylate salt. In an even more preferred embodiment, the superabsorbent polymer is sodium polyacrylate. In an even further preferred embodiment, the superabsorbent polymer is Snow-Real! Instant Decorative Snow, by JRM Chemical, Inc. (Cleveland, Ohio).

In one embodiment, the fluid and superabsorbent polymer are mixed together before placement in the transparent container. In an alternate embodiment, the fluid and superabsorbent polymer are separately added to the transparent container and mixed together while inside the transparent container.

In a preferred embodiment, the ratio of fluid to superabsorbent polymer is between approximately 100:1 and approximately 200:1 by volume, more preferably approximately 140:1 by volume. In a further preferred embodiment, the ratio of water to polyacrylate salt is between approximately 100:1 and approximately 200:1 by volume, more preferably approximately 140:1 by volume.

In another aspect of the present invention, ornamental items are suspended in the fluid and superabsorbent polymer mixture. The ornamental items may be chosen from any class of item which further increases the aesthetic appeal of the display. When the ornamental items are added to the transparent container containing the fluid and superabsorbent polymer mixture, they are mixed or positioned such that they are suspended in the mixture and visible from outside the transparent container.

In an embodiment, the chosen ornamental items are smaller than the transparent container and can fit entirely inside the transparent container. In a preferred embodiment, the ornamental items are smaller than the transparent container such that more than one ornamental item can fit entirely inside the transparent container. In a preferred embodiment, ornamental items may be, without limitation, foam letters, foam shapes, glitter, glitter shapes, confetti, leaves, sequins, tinsel, plastic patterns, flowers, or any combination thereof. The ornamental items can be designed to reflect a theme or an event, such as a holiday or a milestone.

In another aspect of the present invention, a display further comprises a decorative item that extends into, and out of and above, the mixture in the transparent container. This aspect provides for the addition of decorative items that, for example, are larger than the transparent container, or which are the focal point of the display. For example, flower arrangements, balloon arrangements, or candles may be added to the mixture in the transparent container, such that they at least partially extend out of and above the mixture and/or the transparent container.

In an embodiment, the decorative item may be, without limitation, cut flowers, cut plants, greenery, dried flowers, synthetic flowers, mounted balloons, mounted candy, candles, signs, sticks, or any combination thereof.

In a further embodiment, the fluid and superabsorbent polymer mixture is capable of providing liquid or moisture to sustain cut flowers, cut plants or greenery which may be placed in the transparent container.

In a further embodiment, the ornamental items chosen are capable of providing nutrients to cut flowers, cut plants or greenery which may be placed in the transparent container. Alternatively, the ornamental items are capable of preserving plant or flower stems which may be placed in the transparent container.

In another embodiment, plant food and/or plant nutrients are added to the fluid and superabsorbent polymer mixture. Alternatively, plant preservatives are added to the fluid and superabsorbent polymer mixture. In yet another embodiment, artificial coloring can be added to the fluid and superabsorbent polymer mixture.

Another aspect of the present invention is a method for preparing a display comprising mixing a fluid with a superabsorbent polymer, containing said mixture in a transparent container, and suspending ornamental items in said mixture such that the ornamental items are visible from outside the transparent container.

In an embodiment, the display is prepared using a polyacrylate salt as the superabsorbent polymer. In another embodiment, the fluid which is mixed with a superabsorbent polymer is water. In a preferred embodiment, the display is prepared by mixing water with a polyacrylate salt, containing said mixture in a transparent container, and suspending ornamental items in said mixture. In a further embodiment, the mixture is a ratio of between approximately 100:1 and 200:1 by volume of water to polyacrylate salt, more preferably approximately 140:1 by volume.

In an embodiment, the ornamental items which are suspended in the fluid and superabsorbent polymer mixture can be foam letters, foam shapes, glitter, glitter shapes, confetti, leaves, sequins, tinsel, plastic patterns, flowers, or any combination thereof. The ornamental items are mixed into or placed into the fluid and superabsorbent polymer mixture such that they are visible from outside the transparent container.

The suspended ornamental items may additionally function as a plant preservative. Alternately, the suspended ornamental items may provide plant nutrients or plant food to cut flowers, cut plants, or greenery which may be added to the fluid and superabsorbent polymer mixture.

In a further embodiment, the method for preparing a decorative display further comprises the step of adding a decorative item to the decorative display such that the decorative item extends into the fluid and superabsorbent polymer mixture and extends out of and above said mixture. The decorative item may be, for example, cut flowers, cut plants, greenery, dried flowers, synthetic flowers, mounted balloons, mounted candy, candles, signs, sticks, or any combination thereof.

In another embodiment, the method for preparing a display further comprises the step of mixing plant nutrients or plant food with the fluid and superabsorbent polymer. Alternately, the method further comprises the step of mixing plant preservatives with the fluid and superabsorbent polymer. Additionally, the method for preparing a display can comprise the step of adding artificial coloring to the fluid and superabsorbent polymer mixture.

Having described the invention in detail, it will be apparent that modifications and variations are possible without departing the scope of the invention defined in the appended claims. Furthermore, it should be appreciated that all examples in the present disclosure are provided as non-limiting examples.

EXAMPLES

The following non-limiting example is provided to further illustrate the present invention. It should be appreciated by those of skill in the art that the techniques disclosed in the example that follows represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1

A decorative display comprises a transparent container, a mixture of a fluid and a superabsorbent polymer inside the transparent container, and ornamental items suspended in said mixture such that the ornamental items are visible from outside the transparent container.

The mixture was prepared using 1⅜ teaspoons of SnowReal!, a commercially available acrylic sodium salt polymer, obtained from JRM Chemical, Inc. (Cleveland, Ohio). The SnowReal! was added to the transparent container, to which two pints of water were further added. Ornamental items such as mixed confetti and foam pieces were added to the solution. The ornamental items remained suspended in the mixture.

What is claimed is:

1. A display comprising:

a transparent container;

a mixture of water and a superabsorbent polymer in said transparent container;

a decorative item that extends into, and out of and above, said mixture, the decorative item selected from the group consisting of cut flowers, cut plants, greenery, dried flowers, synthetic flowers, mounted balloons, mounted candy, candles, signs, and sticks; and one or more ornamental items having a shape that recognizes or represents a celebratory event, holiday, or season, the ornamental item(s) suspended in said mixture at varying depths and distances from one or more sides of the container such that the ornamental items are visible from outside the transparent container.

2. The display of claim 1 wherein the ornamental items are made of a material selected from foam, plastic, a metallic material, and combinations thereof.

3. The display of claim 1 wherein the ornamental items are selected from the group consisting of letters, shapes, glitter, glitter shapes, confetti, leaves, sequins, tinsel, plastic patterns, and flowers.

4. The display of claim 1 wherein the ornamental items are in the form of one or more shapes selected from the group consisting of party hats, balloons, hearts, diplomas, graduation hats, stars, confetti, tinsel, words, and leaves.

5. The display of claim 1 wherein the ornamental items are selected to recognize a birthday and include one or more of the shapes of party hats, balloons, the word "happy," and the word "birthday".

6. The display of claim 1 wherein the ornamental items are selected to recognize Valentine's Day or an anniversary and include one or more of the shapes of hearts and the word "love".

7. The display of claim 1 wherein the ornamental items are selected to recognize a graduation and include one or more of the shapes of diplomas, graduation hats, stars, and the word "grad".

8. The display of claim 1 wherein the ornamental items are selected to recognize the autumnal season and include one or more shapes of leaves.

9. A display comprising:

a transparent container;

a mixture of water and a superabsorbent polymer in said transparent container;

a decorative item that extends into, and out of and above, said mixture, the decorative item selected from the group consisting of cut flowers, cut plants, greenery, dried flowers, synthetic flowers, mounted balloons, mounted candy, candles, signs, and sticks; and one or more ornamental items having a shape selected from the group consisting of party hats, balloons, hearts, diplomas, graduation hats, stars, confetti, tinsel, letters, words, and leaves, the ornamental item(s) suspended in said mixture at varying depths and distances from one or more sides of the container such that the ornamental items are visible from outside the transparent container.

10. The display of claim 9 wherein one or more of the ornamental items are made of a metallic material.

11. The display of claim 9 wherein the ornamental items include one or more of the shapes of party hats, balloons, the word "happy," and the word "birthday".

12. The display of claim 9 wherein the ornamental items include one or more of the shapes of hearts and the word "love".

13. The display of claim 9 wherein the ornamental items include one or more of the shapes of diplomas, graduation hats, stars, and the word "grad".

14. The display of claim 9 wherein the ornamental items include one or more shapes of leaves.

* * * * *